Nov. 8, 1966 W. H. COWLES 3,283,503
GAS TURBINE FUEL CONTROL
Filed March 30, 1964 3 Sheets-Sheet 1
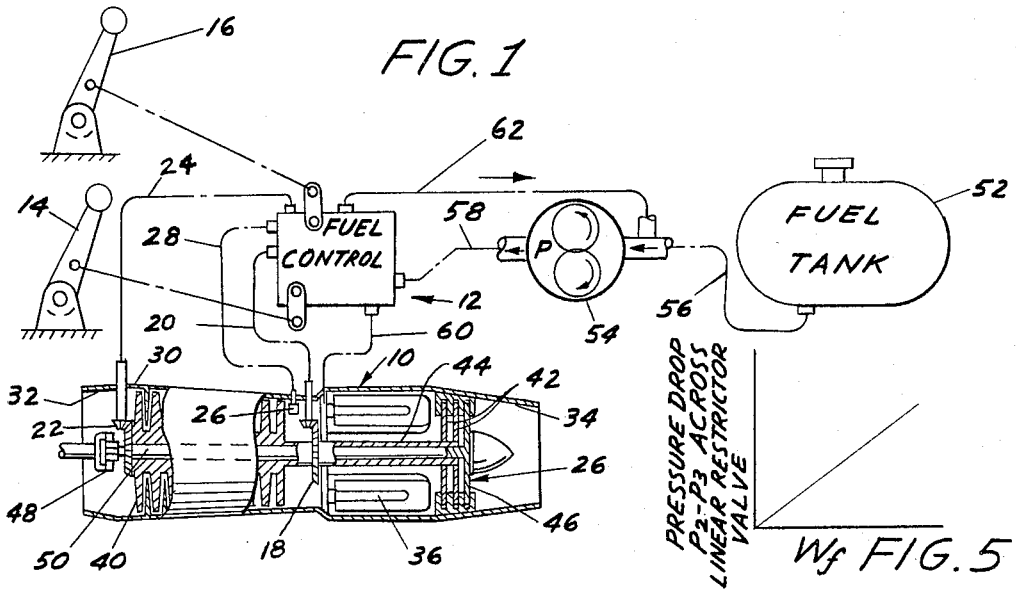
FIG. 1
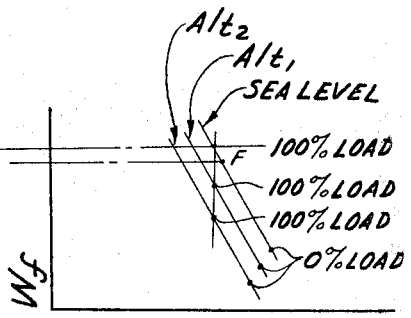
FIG. 5
FIG. 4
FIG. 6
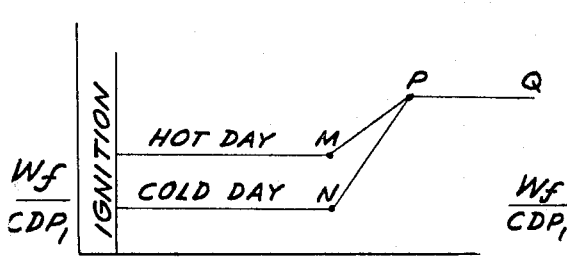
FIG. 7
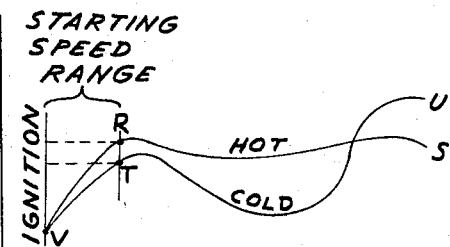
FIG. 8
INVENTOR.
WARREN H. COWLES
BY
ATTORNEY

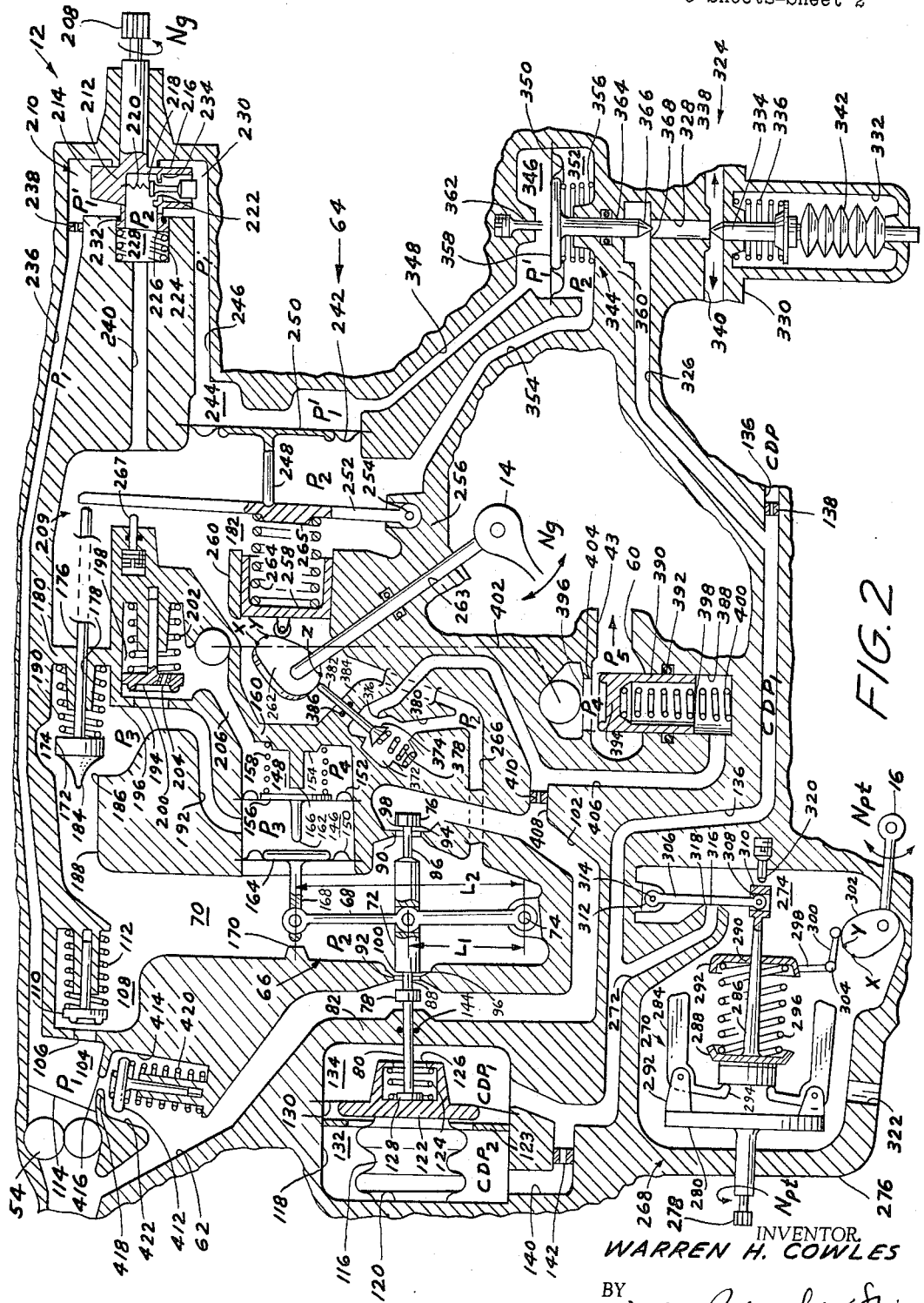

Nov. 8, 1966 W. H. COWLES 3,283,503
GAS TURBINE FUEL CONTROL
Filed March 30, 1964 3 Sheets-Sheet 3

INVENTOR.
WARREN H. COWLES
BY Walter Potmato, Jr.
ATTORNEY 3,283,503
GAS TURBINE FUEL CONTROL
Warren H. Cowles, Birmingham, Mich., assignor to Holley Carburetor Company, Warren, Mich., a corporation of Michigan
Filed Mar. 30, 1964, Ser. No. 355,540
9 Claims. (Cl. 60—39.28)

This invention relates generally to fuel controls, and more particularly to closed-loop scheduling types of fuel controls for gas turbine engines.

It is well known that parameters such as pressure, speed and temperature may be used individually and/or collectively in fuel systems for controlling and determining the operation of gas turbine power plants. However, the means heretofore employed to sense these various parameters and to provide corresponding input signals or control forces have generally been rather complex, often involving squared factors resulting from restriction or orifice type flow usually employed.

A novel means for eliminating the necessity of coping with squared flow factors, resulting in a much less expensive and more compact fuel control system, has been disclosed in U.S. application, Serial No. 264,117, filed on March 11, 1963, in the name of Warren H. Cowles, now abandoned.

This invention embodies many of the features of the fuel control system disclosed by the above referenced application, as well as other novel features producing a number of advantages over previously known systems.

Accordingly, it is a primary object of the invention to provide a lightweight, compact, hydromechanical computing type fuel control which will determine the engine fuel requirements by the use of novel pressure and speed sensing means.

Another object of the invention is to provide such a control which may be used with a typical turboprop or turboshaft engine.

A further more specific object of the invention is to provide such a control wherein the same metering valve that measures the metered fuel flow and produces a linear relationship between metered fuel flow and pressure drop also serves as a gas producer governor valve during the governing process, thus eliminatiing the need for a separate governing valve.

A still further object of the invention is to provide such a control wherein maximum fuel flow is modulated by temperautre and speed.

An additional object of the invention is to provide such a control which includes a novel minimum fuel flow control system.

Still another object of the invention is to provide such a control which includes a manually-operated, hydraulically-controlled fuel shut off valve.

Other objects and advantages of the invention will become more apparent when reference is made to the following specification and the accompanying drawings wherein:

FIGURE 1 is a schematic illustration of a gas turbine engine having a fuel system including a fuel control constructed in accordance with the invention;

FIGURE 2 is a schematic cross-sectional view of the fuel control shown in FIGURE 1;

FIGURE 4 is a graph illustrating generally the relationship of fuel flow to engine (gas producer) speed for engine operating conditions such as acceleration, steady state, and deceleration;

FIGURE 5 is a graph illustrating another characteristic of a fuel control embodying the invention;

FIGURE 6 is a graph illustrating generally the relationship of fuel flow to power turbine (engine) speed, as related to varying load conditions;

FIGURE 7 is a graph illustrating another characteristic of a fuel cnotrol embodying the invention; and FIGURE 8 is a graph illustrating still another characteristic of a fuel control embodying the invention.

Figure 3:
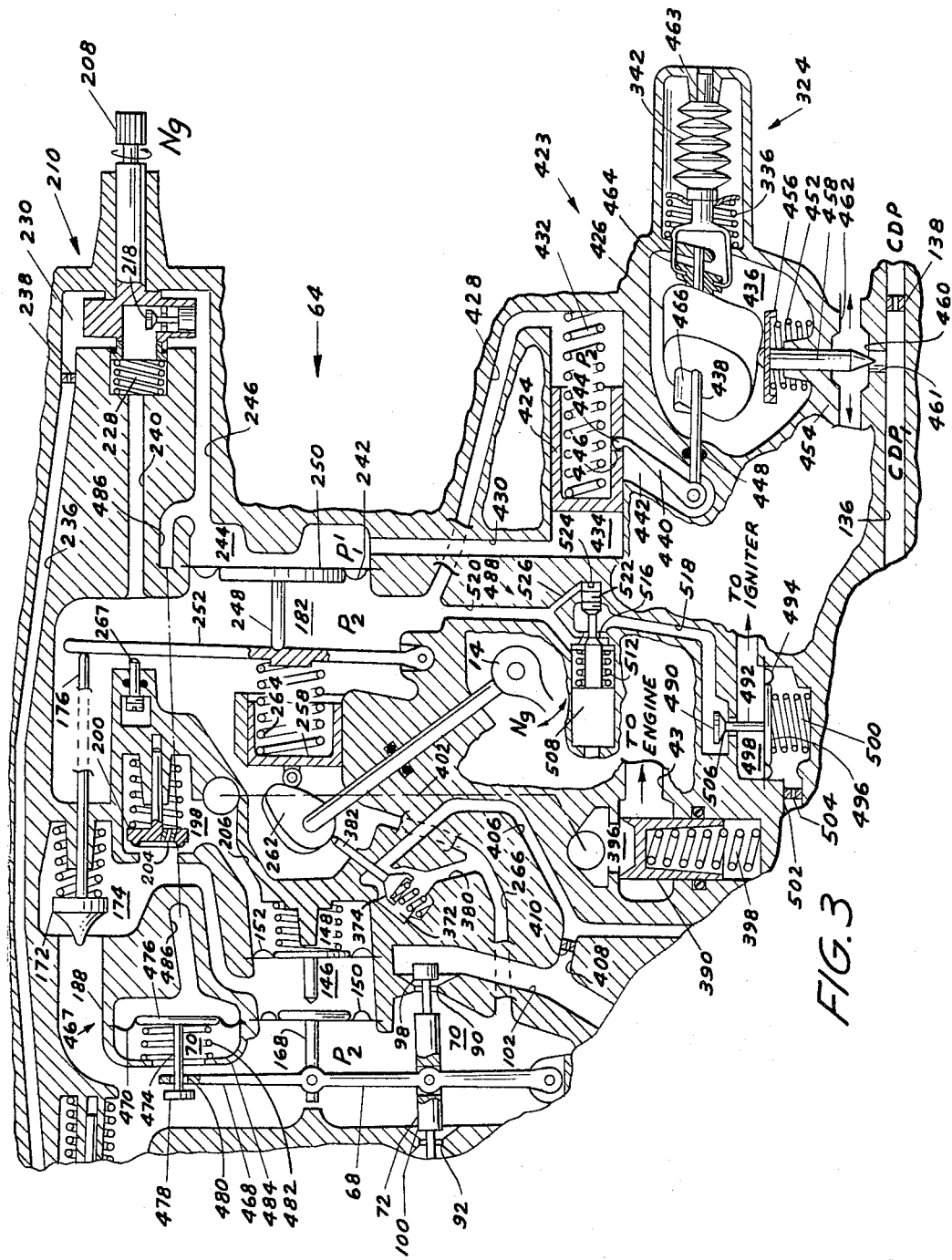
FIGURE 3 is a fragmentary cross-sectional view similar to FIGURE 2, but illustrating a modification of the invention.

Referring now to the drawings in greater detail, FIGURE 1 illustrates schematically a twin spool gas turbine engine 10 having a fuel control 12 which is responsive to manual control by means of a pair of power levers 14 and 16, to engine gas producer speed by means of a gear box 18 and transmission line 20, to power turbine engine speed by means of a gear box 22 and transmission line 24, and to compressor discharge pressure by means of a pressure probe 26 and conduit 28.

While the fuel control 12 shown and to be described herein is responsive to particular parameters, it should be understood that certain novel features of the invention may be employed in a fuel control responsive to other parameters, such as temperature and engine pressures other than that specified above. As to these features, no limitations are intended by the particular parameters employed in the present disclosure for purposes of illustration.

A typical gas turbine engine 10 includes an outer housing 30 having an air intake 32 and exhaust nozzle 34. A combustion chamber 36 having a fuel distribution ring 38 therein is located within the housing 30 between the compressor 40 and the forward turbines 42. The power plant illustrated is of the split turbine type which has its forward turbines 42 driving the compressor 40 by means of a hollow shaft 44. The power turbine 46 may drive a propeller, or, in the case of a turboshaft engine, a gear box 48 by means of a second shaft 50 which is concentric with the hollow shaft 44. Since turboprop and turboshaft engines are basically identical, it is evident that all considerations necessary for a successful fuel control for a turboprop engine would be the same as those for a turboshaft engine fuel control. It is, of course, to be further understood that the invention is not limited to the particular type of turboshaft engine illustrated.

The fuel supply system generally comprises a fuel tank 52, a pump 54, which is usually but not necessarily driven by the engine 10, and supply conduits 56 and 58 for delivering fuel to the fuel control 12. The pump 54 may be incorporated within the fuel control 12 itself, as illustrated in FIGURE 2. The fuel control 12 meters the correct fuel flow for the particular engine operatiing requirements, as dictated by the above mentioned engine speed and compressor discharge pressure parameters, in a manner which will be described below. Correctly metered fuel is transferred to the fuel distribution ring 38 via a conduit 60, any excess fuel being bypassed back to the inlet side of the pump 54 through a return passageway 62, in a manner to be described.

*Acceleration fuel system including minimum and maximum fuel flow means*

As seen in FIGURE 2, the fuel control 12 comprises in part a plural cavity housing 64 formed in any suitable manner and containing an acceleration fuel system 66. A force balance lever 68 is pivotally secured to the fuel control housing 64 in one of the chambers 70 therein. A valve stem 72 is pivotally connected to the lever arm 68, at a predetermined distance $L_1$ from the pivot point 74 of the lever 68, so as to be positioned substantially perpendicular to the lever arm 68. The ends 76 and 78 of the valve stem 62 may be slidably confined within guide members (not shown). Two reduced diameter portions 86 and 88 formed on the stem 72 operate through a pair of annular openings or valve seats 90 and 92 formed within the housing 64 such that spa[j]ced shoulders 94 and 96 function as a pair of valves, hereinafter referred to as valves 98 and 100.

A passageway 102 communicates between the openings 90 and 92 and thence with the single passage 62 which returns to the inlet side of the pump 54. A passageway 104, a port 106 and a chamber 108 communicate between the outlet side of the pump 54 and the chamber 70. A valve 110 may be slidably mounted in the chamber 108 and urged toward the port 106 by a spring 112, serving a purpose which will be described later. The passageway 104 may include a screen 114 or filter.

An evacuated bellows 116 in another chamber 118 of the housing 64 is fixedly attached at its one end to a wall 120 of the housing 64 in any suitable manner. The other end of the evacuated bellows 116 is secured to a spring and diaphragm retainer element 122 by any suitable means. A stop member 123 is formed adjacent the retainer element 122 in the vicinity of the bellows 116. A spring 124 is confined between an internal flange 126 formed on the retainer element 122 and a shoulder 128 formed on an extension 80 of the valve stem 72 such that the valve stem 72 is urged toward the spring and diaphragm retainer element 122. The spring 124 and the stop member 123 control maximum fuel flow in a manner to be described. A diaphragm 130, secured to the retainer element 122 in any suitable manner, divides the chamber 118 into two variable-sized chambers 132 and 134 by forming a movable wall therebetween.

Compressor discharge air pressure, CDP, enters a passageway 136 in the housing 64 via the conduit 28 and thence communicates with the chamber 134 by means of said passageway 136, the latter including a fixed restriction 138 which serves to stabilize the system and produces a reduced pressure $CDP_1$. A branch passageway including a second fixed restriction 142 therein communicates a pressure $CDP_2$ between the passageway 136 and the other variable chamber 132. The diaphragm 130, in conjunction with the restriction 142, serves to control the rate of movement of the valve stem 72, as will be explained later. The compressor discharge pressure $CDP_2$ is referenced to absolute zero by virtue of the bellows 116 being evacuated.

A low pressure seal 144 is sufficient to separate the air chamber 134 from the low pressure fuel passageway 102 adjacent the high pressure fuel chamber 70. In view of its position in a low pressure area, the seal 144 may be an ordinary diaphragm.

Third and fourth chambers 146 and 148 are formed by incorporating a pair of diaphragms 150 and 152 a fixed distance apart in a recess 154 formed in a wall of the chamber 70. A washer 156 fastened in the usual manner to the diaphragm 152 serves as a seat for one end of a spring 158, the other end thereof seating against a wall 160 of the housing 64. In this position, the spring 158 urges the inner diaphragm 152 toward the outer so-called feedback diaphragm 150. A stem 162 extending from the washer 156 forms a stop in the chamber 146 against which the washer 164 secured to the feedback diaphragm 150 will occasionally abut. A member 166 is also formed on the wall 160 in the chamber 148 serving as a stop for the washer 156 and diaphragm 152 when they move in a direction away from the feedback diaphragm 150. A stem 168 also extends from the feedback washer 164 into the chamber 70 and is pivotally attached to the lever arm 68 at a second predetermined distance $L_2$ from the fixed pivot point 74. A second fixed stop 170 may extend from the housing 64 into the chamber 70 in order to limit movement of the diaphragm 150 toward the chamber 70 and to thus prevent diaphragm damage.

A so-called linear restrictor valve 172 is located in another chamber 174 formed within the housing 64. This valve 172 may include a stem 176 which is slidably fitted through an opening 178 in the wall 180, extending into still another chamber 182. The end of the valve includes a surface 184 which is specially contoured for a purpose to be described later. The contoured surface 184 serves as a variable orifice valve by virtue of its reciprocal movement relative to a valve seat 186 formed at the outlet of a passageway 188 which communicates between the chambers 70 and 174. A spring 190 surrounding the valve stem 176 urges the valve 172 toward the seat 186. A passageway 192 communicates between the valve chamber 174 and the feedback chamber 146 between the diaphragms 150 and 152. An opening 194 in a well 196 of the housing 64 communicates between the valve chamber 174 and still another chamber 198 wherein a minimum flow control valve 200 is slidably mounted in any suitable manner and urged toward the opening 194 by a spring 202. A fixed restriction 204 is formed through the face of the valve 200 providing continual communication between the chambers 174 and 198. A passageway 206 communicates between the chamber 198 and the chamber 148. Minimum fuel flow is controlled by the valve 200 and restriction 204 in conjunction with the spring 158 and diaphragm 152 in a manner to be described.

Hydraulic governing system

The transmission line 20 (FIGURE 1) is connected between the gear box 18 driven by the gas producer shaft 44 and the shaft 208 extending from the hydraulic governing system 209 of the fuel control 12. As seen in FIGURE 2, a hydraulic speed sensing unit 210 of a conventional centrifugal type is attached to the shaft 208 for rotation therewith. The speed sensing unit 210 may be substantially comprised of a generally tubular center portion 212 which has formed thereon or secured thereto a pair of radially extending members 214 and 216. The member 216 has an axial bore containing a centrifugal valve 218 which is normally urged open by the spring 220. The valve 218 is thus adapted to control fluid flow through port 222 which is formed within the member 216 in accordance with the speed of the engine 10.

The inlet valve 110 maintains a constant pressure drop across the port 222 and a fixed restriction 238 resulting from flow changes through the valve 110, the chambers 182 and 70 associated therewith being interconnected by a passage 266.

A spring 224 and spring seat 226 located in a chamber 228 maintains a proper location of the members 214 and 216 within the generally cylindrical chamber 230, as the members 214 and 216 are rotated by the shaft 208 and transmission 20. A seal 232 prevents leakage or flow between the chambers 228 and 230, other than through passage 234 in the valve weight and the port 222. A passageway 236 containing a restriction 238 communicates between the passageway 104 and the chamber 230, while the valve 218 and chamber 228 serve to communicate between the chamber 230 and a passage 240 leading to the chamber 182.

A diaphragm 242 forms a movable wall between the chamber 182 and still another chamber 244, and a passageway 246 communicates between the chambers 230 and 244. A member 248 extends from the diaphragm washer 250 into the chamber 182 so as to contact a governor lever arm 252, the latter being pivotally supported at its one end on a pivot pin 254 secured to a wall 256 of the housing 64. The lever arm 252 is of sufficient length to engage the stem extension 176 of the linear restrictor valve 172. A movable spring retainer 258 is slidaby mounted in a cylinder 260 formed in the chamber 182 for reciprocal actuation therein, in response to the position of the rotatable cam 262 connected to the manual selector lever 14 through suitable linkage 263. A spring 264 is confined between the retainer 258 and a seat 265 formed on the governor lever 252. As previously indicated, the passageway 266 communicates between the hydraulic governor chamber 182 and the acceleration fuel system chamber 70. An adjustable minimum fuel flow stop 267 extends into the chamber 182 so as to limit the counterclockwise movement of the lever arm 252 and to hence, control the minimum opening of the orifice 184/186 due to contact of the stem 176 by the lever arm 252.

Pneumatic governor system

The pneumatic governor system 268 shown in FIGURE 2 is basically a proportional type. The governor system 268, which includes a power turbine speed sensing mechanism 270, may be readily embodied in the complete fuel control mechanism, either as an attachment to or as an integral part of the housing 64.

The governor system 268 may be functionally connected to the acceleration fuel system 66 by means of a branch passageway 272 communicating between the passageway 136 and a chamber 274 in the governor mechanism housing 276.

A shaft 278 extending from the housing 276 through a bearing (not shown) is connected to and rotated by the transmission line 24. A plate 280 fixedly attached to the shaft 278 rotates within the chamber 274 and has affixed thereto a plurality of supports 282 to which a corresponding number of flyweights 284 are pivotally secured. A stem 286 having a flanged collar 288 formed on one end thereof extends through a center hole 290 in a manually positioned spring seat 292 and is urged against the ends 294 of the flyweights 284 by a spring 296, the latter being compressed between the spring seat 292 and the collar 288. The spring seat 292 is positioned by virtue of its being attached to an L-shaped lever 298, one arm 300 of which is in contact with a cam 302. The lever 298 is pivoted about the point 304, and the cam 302 is rotated by the selector lever 16.

A lever 306 is pivotally connected at its one end 308 in some suitable manner to the end 310 of the stem 286, while its other end 312 is pivotally connected to a fixed pivot 314 attached either to the housing 276 or to the housing 64 if integral therewith. A portion of the lever 306 intermediate the ends 308 and 312 serves as a valving surface 316 relative to a valve seat 318 which forms the inlet to the branch passageway 272. Maximum opening of the valve 316/318 and, hence, minimum power turbine fuel flow schedule, is determined by an adjustable stop 320. The chamber 274 is exposed to ambient air by means of a port or bleed 322.

Temperature sensor

If desired, a temperature sensor 324 may be incorporated in the system in order to bleed off compressor discharge air once its pressure exceeds a predetermined value as a result of an increase or decrease in temperature of some selected medium. In other words, in a particular engine it may be desirable to bleed off CDP when a particular higher regenerator temperature is reached or when ambient temperature decreases below a preselected value as a result of an increase in altitude.

This may be accomplished by incorporating the temperature sensor 324 in series with a pair of passageways 326 and 328, one of which communicates with the passageway 136. The temperature sensor 324 may comprise a housing 330 including a chamber 332 and a valve 334 urged by a spring 336 away from the outlet 338 of the passageway 328. Bleeds 340, adjacent the outlet 338 are variably controlled by the valve 334. Bimetallic disks 342 may be confined between the end of the valve 334 and the housing 330. Depending upon the disks 342 selected, an increase or a decrease in temperature would cause the disks 342 to contract, thereby permitting the spring 336 to urge the valve 334 further away from the outlet 338, resulting in the bleeding off of $CDP_1$ through the bleed ports 340.

Speed bias device

When required by a particular engine, a speed bias device 344 may be provided by forming a chamber 346 in the housing 64, a passageway 348 communicating between the chamber 346 and the chamber 244, and a diaphragm 350 forming a movable wall between the chamber 346 and an adjoining chamber 352. A passageway 354 communicates between the chamber 352 and the hydraulic governor chamber 182. A spring 356 is confined between the diaphragm washer 358 and a wall 360 of the housing 64 so as to urge the diaphragm 350 away from the wall 360 toward an adjustable stop 362 extending into the chamber 346. A valve stem 364 which may include a shaped end portion 366, slidably extends through the wall 360 across the passageway 326 toward the entrance 368 of the passageway 328, the entrance 368 serving as a valve seat for the shaped end 366 for a purpose to be described. A seal 370 may be provided around the stem 364 in the wall 360 to prevent leakage between the fuel chamber 352 and the air passageway 326.

Automatic shut-off valve

When desired, an additional chamber 372 may be formed in the housing 64, the chamber 372 containing a valve 374 and valve seat 376, the valve 374 being urged toward the seat 376 by a spring 378. A passageway 380 communicates between the chamber 372 and the passageway 266, and a stem 382 extends from the valve 374 through a wall 384 containing a seal 386 into the hydraulic governor chamber 182 for at times being contacted by the cam 262.

Still another recess 388 may be formed to house a valve 390 which is slidably mounted therein and surrounded by a fixedly mounted seal 392. The valve face 394 serves as a movable wall dividing the recess 388 into two variable chambers 396 and 398. A spring 400 mounted within the chamber 398 urges the valve 390 toward the chamber 396, and a passageway 402 communicates between the chamber 396 and the chamber 198. The conduit 43 communicates between the fuel distribution ring 38 (FIGURE 1) and the chamber 396, the valve 390 serving to control the opening 404 therebetween in a manner to be described. A passageway 406 communicates between the orifice 374/376 and the chamber 398, while a branch passageway 408, including a fixed restriction 410 therein, communicates between the passageway 406 and the bypass passageway 102.

Pressure relief valve

A pressure relief valve 412 may be slidably mounted in any suitable manner in a chamber 414 adjacent the inlet passageway 104. An opening 416 in a wall 418 of the housing 64 communicates between the passageway 104 and the chamber 414, and a spring 420 urges the valve 412 toward the opening 416. An additional passageway 422 communicates between the chamber 414 and the bypass passageway 62. The valve 412 serves to bypass pump 54 discharge fuel to the pump 54 inlet when the discharge pressure reaches a predetermined value.

OPERATION

Before explaining the operation of the fuel control 12 in detail, it is deemed advisable to first give a brief summary of its operation. As explained above, fuel from the tank 52 is supplied via the conduit 56 to the inlet passageway 104 by means of pump 54, which is usually (but not necessarily) driven by the engine 10 and the capacity of which is more than sufficient to supply the total fuel requirements for any condition of engine operation. The portion of the inlet fuel actually supplied to the engine 10 is, of course, determined automatically by the fuel control 12 itself. From the inlet passageway 104, fuel flows into the chambers 108 and 70, through the passageway 188, past the linear restrictor valve 172, through the opening 194 into the chamber 198, through the passage 402 and the chamber 396 and then to the engine 10 through the conduit 43. It will thus be seen that all of the inlet fuel goes to the engine 10, except that fuel which is bypassed from the chamber 70 through the orifices 98 and 100, into the passages 102 and 62 and thence back to the inlet of the pump 54.

The amount of fuel bypassed is controlled by the movement of the evacuated bellows 116 in response to compressor discharge pressure, the latter being modulated by the position of the valve 316/318 in the pneumatic governor system 268. Movement of the lever arm 306 operating the valve 316/318 is determined by the preload of spring 296 set by cam 302, which is rotated by the manual selector lever 16 and the operation of governor weights 284.

It may also be advantageous to first describe generally the operation of the basic closed-loop moment balance system 66 and the effect of the novel linear restrictor valve 172. For this purpose, it can be assumed that the system 66 is in equilibrium and that the compressor discharge pressure decreases for some reason or another that is not important in this discussion. With that assumption in mind and ignoring for the moment the derivative diaphragm 130, the maximum fuel flow spring 124 and the minimum fuel flow valve 200 and diaphragm 152, and referring to FIGURE 2, it can be seen that as the valve stem 72 and the attached lever arm 68 move to the right in response to a decrease in compressor discharge pressure surrounding the evacuated bellows 116, more fuel is bypassed through the ports 98 and 100, the passageway 102 and ultimately to the inlet of the pump 54 through the passageway 62. This results in a decrease in pressure in the chamber 70. The linear restrictor valve 172 is then urged toward a more nearly closed position by the spring 190, resulting in a decrease in pressure in the passageway 192 and the chamber 146 to the right of the diaphragm 150.

It can be seen from the solid straight line curve of FIGURE 5 that the pressure differential, $P_2-P_3$, will decrease lineally as the fuel flow $W_f$ decreases. The linear relationship is achieved by suitably contouring the valve 172. Since the force $F_1$ is reduced due to the effect of the decrease in compressor discharge pressure on the evacuated bellows 116 in the chamber 134, it reduces the $P_2-P_3$ differential, which, in conjunction with the diaphragm 150, produces a lesser force $F_2$ than before the additional fuel was bypassed, and results in a return of the moment balance system to equilibrium. In other words, a reduction in force $F_1$ eventually results in a reduction in force $F_2$ so as to return the system to equilibrium. The term "closed-loop" is commonly applied to this type of equilibrium-seeking moment balance system, and the above type of operation takes place whenever anything occurs to throw the system out of balance.

The detailed operation of the complete fuel control unit 12, as illustrated in FIGURE 2, will now be discussed in conjunction with a typical Fuel Flow ($W_f$) vs. Speed (N) curve (FIGURE 4) illustrating the various engine operating conditions.

It will first be assumed that the engine 10 has been started and that it is idling at sea level, at which time fuel control unit 12 is receiving fuel at a pressure $P_1$ from the pump 54 through the inlet passageway 104. This idle condition of engine operation is represented by point A of FIGURE 4. At this time, the pressures within the fuel control unit 12 would be as indicated by FIGURE 2; i.e., there would be a pressure drop across the fixed restriction 238 resulting in a pressure $P_1'$ in the chamber 230, a pressure drop across the valve 110, resulting in a pressure $P_2$ in the chambers 108 and 70, a further pressure drop across the linear restrictor valve 172 resulting in a pressure $P_3$ in the chamber 174, a still further pressure drop across the valve 200, resulting in a pressure $P_4$ in the chambers 198 and 148, and a final pressure drop across the valve 390, resulting in fuel at a pressure $P_5$ being supplied to the engine 10.

Furthermore, the system would be in a steady state or equilibrium condition. That is, the compressor discharge pressure, heretofore referred to as $CDP_1$, in chamber 134 would have compressed the evacuated bellows 116 to produce a force $F_1$ to the left (FIGURE 2) and resulting in a moment balance ($F_1 \times L_1 = F_2 \times L_2$) about pivot 74 of lever arm 68, the force $F_2$ resulting from the $P_2-P_3$ differential across diaphragm 150. As illustrated in FIGURE 2, $L_1$ and $L_2$ may be any predetermined lengths along the lever arm 68. During this steady state condition, a particular constant amount of fuel would be by-passed back to the pump 54 inlet through passages 102 and 62.

The effect of the hydraulic gas producer governing system 209 will now be considered. Prior to take-off, the manual selector lever 14 would be pivoted so as to rotate the cam 262 in a counterclockwise direction until some point X is in contact with the spring retainer 258. Looking again at FIGURE 4, the result of moving lever 14 would be an acceleration, which is a transient or non-equilibrium condition, along the dotted curve toward some equilibrium or steady state point B on the sea level curve. During this transient condition, the spring retainer 258 would have been moved to the right in FIGURE 2, compressing the spring 264 and instantaneously rotating the lever arm 252 completely away from the stem extension 176 to some maximum stop, the stop being determined either by the limit of movement of stem 248 to the right against the pressure $P_1'$ or by some definite fixed stop similar to stop 267. Since the pressure $P_1$ from the pump 54 would increase with the increasing speed, $P_2$ in the chambers 108 and 70, would now be higher, and, with the lever arm 252 away from the stem 176, $P_3$ in the chambers 174 and 146 would be substantially higher, allowing more fuel to flow through the chamber 198, the passageway 402 and the outlet 404 to the engine 10.

Because of the contoured shape of the valve 172 and as illustrated by FIGURE 5, a higher pressure differential $P_2-P_3$ would have resulted across the diaphragm 150 to move the lever arm 68 to the right in FIGURE 2. The valve stem 72 would thus move toward a more open position so as to bypass more fuel through the ports 90 and 92. In the meantime, however, $CDP_1$ would have increased in the chamber 134 via the passageway 136, thereby tending to compress the evacuated bellows 116 and restrict the bypass flow through the ports 90 and 92.

The effect of the pneumatic governing system 268 and the speed bias device 344 on $CDP_1$ will be discussed later. For the time being, it may be observed that the initial transient or non-equilibrium condition would result momentarily in $CDP_1$ being greater than $CDP_2$ by virtue of the fixed restriction 142 in the branch passageway 140 leading to the chamber 132. This increased $CDP_1$ and the differential ($CDP_1-CDP_2$) would serve to instantaneously move valves 98 and 100 to the left tending to close off the ports 90 and 92, resulting in an increase in pressure $P_2$ in the chamber 70 and an increased flow of fuel to the engine via the chambers 174, 198 and 396 and the conduit 43. The derivative diaphragm 130 and the branch passageway 140 and restriction 142 may be employed to give a faster initial response to satisfy the requirements of a particular engine 10. When pressure $CDP_2$ becomes equal to $CDP_1$, the effect of the derivative diaphragm 130 is, of course, completed; however, the increased $CDP_1$ is still effective.

Maximum fuel flow may be very simply controlled by the stop member 123 and the effect of the spring 124 on the co-operation between the valve stem 72 and the diaphragm retainer 122. The calibration of the spring 124 is such that, after $CDP_1$ increases beyond some predetermined amount, the spring 124 will compress, causing the valve stem 72 to remain stationary and thereby progressively decreasing the opening of the ports 90 and 92, and hence increasing the pressure $P_2$ and the fuel flow past the linear restrictor valve 172 to the engine 10, the maximum being determined by the contact of the retainer element 122 against the stop member 123.

As the speed increases with increased $CDP_1$, pressure $P_1$ would likewise have been increased, as would the $P_1'-P_2$ differential across the centrifugal valve 218. This would move the diaphragm 242 and stem 248 to the left in FIGURE 2, thereby rotating the lever arm 252 in a counterclockwise direction until such time as the movement of lever 252 is counteracted by the force of the spring 264 on the lever arm 252. Contact of arm 252 with the stem 176 would throttle or reduce the fuel flow from the chamber 70 past the linear restrictor valve 172 and, in turn, increase $P_2$ in the chamber 70. As a result, the pressure differential $P_2-P_3$ across the diaphragm 150 would initially increase. This would move the lever arm 68 toward the right in FIGURE 2. The valve stem 72, being affixed to the lever arm 68, would also move to the right, until balanced by the effect of $CDP_1$ and the spring 124 on the evacuated bellows 116. Since the above operation is at sea level, the resultant balanced condition would be represented by point B on the sea level curve of FIGURE 4.

Once the aircraft has taken off and while climbing to some altitude which is represented by point C in FIGURE 4, $CDP_1$ will continually decrease, permitting the valve stem 72 to move toward the right in FIGURE 2, as permitted by the expansion of the bellows 116. As additional fuel is bypassed, the pressure differential $P_2-P_3$ decreases across the diaghragm 150, as well as across the linear restrictor valve 172, resulting in a decreased flow past the valve 172. The governor hook, represented by the dash line of FIGURE 4 is, in effect, shifted with increased altitude to form substantially an isochronous governing relationship between points B and C.

This will bypass more fuel through the passageways 102 and 62 to the pump 54 inlet, causing a reduction of pressure $P_2$ in chamber 70 and in the passageway 188. This would permit the spring 190 to force the linear restrictor valve 172 toward the seat 186, thereby reducing the flow past the valves 172 and 200 and via the passageway 402 to the outlet 404 and thence to the engine 10, and at the same time reducing pressure $P_3$ in the chambers 174 and 146. The $P_2-P_3$ differential would, of course, be lowered with decreased fuel flow, permitting the acceleration fuel system 66 to once again come to an equilibrium condition.

Minimum fuel flow to the engine 10 may be controlled by providing novel automatic means for decreasing the amount of fuel which may be bypassed through the ports 90 and 92, once the fuel flow to the engine 10 has decreased for other reasons to a predetermined amount. It may be noted that as $P_3$ in the chamber 174 and the passageway 192 decreases, the valve 200 in the chamber 193 will be urged toward the opening 194 by the spring 202. Springs 112, 190 and 400 are such that valves 110, 172 and 394, respectively, will not completely close under any operating $P_1$, $P_3$ and $P_4$ pressures. Additionally, the valve 172 cannot be completely closed by the lever 252, in view of the stop 267. Once the orifice 200/194 is closed, a minimum amount of fuel will flow through the fixed restriction 204. Thereafter, as $P_3$ continues to decrease, the $P_3-P_4$ pressure differential across the diaphragm 152 will continue to decrease until overcome by the spring 158. This will project the diaphragm stem 162 further into the chamber 146 until it contacts the feedback diaphragm washer 164 and moves it to the left in FIGURE 2, thereby closing the ports 90 and 92 and once again causing $P_2$ to increase.

Steady state or equibrium operation represented by point C in FIGURE 4 would be maintained until such time, for example, as it would be desired to decrease speed. Decreasing speed would be accomplished by moving selector lever 14 in the opposite direction so as to rotate cam 262 counterclockwise from X to Y, thereby lowering the pressures throughout the system, increasing bypass fuel flow and decreasing fuel flow to the engine 10, all of which is the reverse of what happened when cam 262 was first moved to X. The above would result in a deceleration from point C to point D, along the dot-dash line of FIGURE 4, the precise deceleration line being determined by the setting of the minimum flow stop 267 as well as by $CDP_1$. The acceleration and deceleration lines illustrated in FIGURE 4 for sea level conditions would be progressively lowered with increased altitudes, hence the illustration of the dot-dash line below the sea level deceleration line.

After dropping in altitude to $Alt_1$, acceleration from point H to a greater speed, such as indicated by point E, would be along the dash-double-dot line to the dotted acceleration line, and then along the "X" line to E. Being at a lowered altitude than point C, the governor hook for point E, represented by the "X" line, is illustrated between the governor hooks of points B and C, maintaining the substantially isochronous governing relationship discussed above for the same throttle setting used to produce points B and C.

While the gas producer governing system 209 will establish the maximum amount of power available and operate in conjunction with the Fuel Flow ($W_f$) vs. Gas Producer Speed ($N_g$) curve of FIGURE 4 as just described, there are various applications wherein it may be necessary or desirable to limit the percentage of maximum power insofar as the equipment being driven by the power turbine shaft 50 and gear 48 is concerned. This is controlled by the second governing system, preferably a pneumatic type as illustrated schematically at 268, which may be set to bleed off $CDP_1$ in a manner to be described.

Prior to take off, the second manual selector lever 16 would be pivoted so as to rotate the cam 302 in a clockwise direction until some point X is in contact with the arm 300. This would pivot the L-shaped lever 298 and its associated spring seat 292 in a counterclockwise direction about the fixed pivot pin 304, thereby compressing the spring 296 and causing the stem 286 to be pulled toward the left (FIGURE 2). This would rotate clockwise the lever arm 306 about the fixed pivot point 314, thereby closing the valving surface 316 against the valve seat 318. If point X were selected such that the valve 316/318 were closed, all of the increased $CDP_1$ would be supplied to chambers 134 and 132 via the passageways 136 and 140 and fixed restrictions 138 and 142. In this case, the gas producer governor system 209 would function exactly as described above.

However, if point X were selected such that the valve 316/318 remains partially open, some $CDP_1$ would be bled into the chamber 274 and thence through the vent 322 to the atmosphere. The resultant Fuel Flow ($W_f$) vs. Power Turbine Speed, ($N_{pt}$) relationship could, for example, be represented by point F of the FIGURE 6 curve. A horizontal projection of this point onto the particular steady state curve of FIGURE 4 involved in the gas producer operation, the sea level curve for example, would indicate the maximum $W_f$ vs. $N_g$ point G available along that curve. Under these circumstances, point B, for example, as called for by the the manual selector lever 14, would be unattainable.

Functionally, this would result by virtue of less $CDP_1$ and $CDP_2$ being available for the chambers 134 and 132, respectively, and therefore less force $F_1$ available to pull the valve stem 72 to the left. Thus, more fuel would be bypassed through the ports 90 and 92, and hence less fuel would flow past the linear restrictor valve 172 to the engine 10, resulting in the $W_f$ vs. $N_g$ relationship being limited to point G, instead of being able to attain point B.

One gas turbine engine specifications sometimes required to be considered is, in effect, a plot of $W_f/CDP_1$ vs. $N_g$ (gas producer speed). Some engines, for example, require a constant $W_f/CDP_1$ ratio over the entire speed range; other engines may require a ratio that is influenced by ambient temperature, for example, between certain so-called "hot day" and "cold day" limits throughout a particular $N_g$ speed range. Particular "hot day" and "cold day" requirements could be those established by NASA specifications, for example. A standard cold day being —65° F. and a standard hot day being, say 130° F. This same engine may require a variably increasing $W_f/CDP_1$ ratio at some predetermined higher $N_g$ speed range, with the $W_f/CDP_1$ ratio required to be constant and uninfluenced by ambient temperature at still higher $N_g$ speeds. This is illustrated graphically by FIGURE 7.

The temperature influence on the value of $CDP_1$ would, of course, result from the operation of the temperature sensor 324 in the manner previously described. This would determine the particular $W_f/CDP_1$ point between the hot and cold limits at $N_g$ speeds below that subtended by points M and N in FIGURE 7. Upon reaching the M, N speed line, the speed bias device 344 could be calibrated in such a way that it would then begin to operate. As speed increases thereafter, the $P_1'-P_2$ pressure differential across the diaphragm 350 would increase, moving the valve stem 364 downwardly in FIGURE 2, across the passageway 326, and closer to the inlet 368. This, of course, would reduce the amount of $CDP_1$ being bled off through the ports 340, thereby increasing the pressure $CDP_1$ in the chamber 134 and thus reducing the amount of fuel being bypassed to the pump 54 inlet and correspondingly increasing the fuel flow to the engine 10 in the manner previously described. So long as the valve 364 is out of contact with the seat 368, ambient temperature will continue to affect the temperature responsive disks 342 and, hence, vary the opening 334/338. Thus, the $W_f/CDP_1$ ratio, in the $N_g$ speed range corresponding to points M or N as a lower limit and point P as an upper limit, will be somewhere between the limit curves MP and NP. Once the valve stem 364 has closed against seat 368, the $W_f/CDP$ ratio in the high $N_g$ speed range to the right of point P will be constant, as illustrated by the curve PQ.

Throughout the above described operation, while the cam 262 has some point thereof, such as X or Y, in contact with the movable spring retainer 258, it may be noted from FIGURE 2 that some point Z, which is closer to the axis of the cam, will be in contact with the automatic shut-off valve stem 382. In this position, the valve 374 will be urged closed against the opening 376 by the spring 378 mounted in the chamber 372. Thus, fuel at pressure $P_2$ will be prevented from flowing from the passageway 266 through the passageway 380 and the chamber 372 into the passageway 406; instead, the fuel in the passageway 406 and the chamber 398 will be at a low pressure by virtue of the communication of bypassed fuel from the passageway 102 through the passageway 408 and its fixed restriction 410. Fuel at pressure $P_4$ in the chamber 396, being considerably higher than the pressure in chamber 398, will cause the piston 390 to compress the spring 400 and fully open the outlet 404 into the conduit 43.

At the end of the flight, when cam 262 is rotated in a counter-clockwise direction, it may be noted from FIGURE 2 that a high point of the cam 262, such as point X or point Y, will now be in contact with the valve stem 382. This, of course, will lift the valve 374 from the seat 376 and compress the spring 378 in the chamber 372. Now, high pressure fuel from chamber 70 will be free to flow through the passageways 266 and 380 into the chamber 372, past the valve 374/376, into the passageway 406. The resultant high pressure in the chamber 398, combined with the force of spring 400, will quickly move the valve 390 upwardly and completely close off the outlet 404. This will prevent any subsequent leakage through the conduit 43 to the engine 10.

Some engines may require a more complicated and variable $W_f/CDP_1$ relationship, such as that illustrated by curves RS or TU of FIGURE 8. Such a result may be obtained by utilizing the modification illustrated in FIGURE 3. It may be noted that the speed bias system 423 includes a piston 424 and three-dimensional cam 426 arrangement, in lieu of the diaphragm type device 344 of FIGURE 2. In this embodiment, the speed-indicative pressure differential $P_1'-P_2$ would be in affect across the piston 424 by virtue of the passageways 428 and 430 being in communication between the chambers 182 and 432 and between the chambers 244 and 434, respectively.

With increased speed, the $P_1-P_2$ pressure differential across the piston 424 would increase, moving the piston 424 to the right in FIGURE 3, thereby causing the cam 426 located in a chamber 436 to rotate in a clockwise direction by means of a shaft 438 and a lever 440 fixedly attached to the end thereof in a chamber 442. The end 444 of the lever 440 is confined within an opening 446 in the side of the piston 424 for movement therewith. A seal 448 may be confined within the wall 450 to prevent leakage of fuel from the chamber 442 around the shaft 438 into the air chamber 436.

A spring 452 confined between a wall 454 and a spring retainer 456 secured to the end of a valve stem 458 urges the stem 458 into contact with the cam 426. The clockwise rotation of the three-dimensional cam 426 will cause the valve stem 458 to move either downwardly or upwardly depending upon the particular cam contour. The effect on the valve stem 458 is to move it toward or away from the outlet 460 of a passageway 461 branching off the passageway 136. This, of course, reduces or increases the amount of $CDP_1$ being bled off through the ports 462 located adjacent the outlet 460, thereby correspondingly increasing or decreasing the pressure $CDP_1$ in the chamber 134 (FIGURE 2).

A further influence on the amount of $CDP_1$ being bled off to the atmosphere through the ports 462 would be affected through the temperature sensor 324. Instead of including a valve stem 334 as illustrated in FIGURE 2, the temperature sensor 324 may include a stem 463 with an attached yoke 464, the latter being secured to the cam 426 by any suitable means. As the temperature responsive disks 342 expand or contract, the yoke 464 will move the cam 426 axially along the shaft 438 and an associated key 466. The contoured shape of the cam 426 is such that this axial movement will either move the valve stem 458 toward the opening 460 against the force of the spring 452 or permit the spring 452 to lift the valve stem 458 away from the opening 460, thus providing an additional means for modifying the amount of air pressure $CDP_1$ being bled off to the atmosphere.

The above described dual influence on the cam 426, and hence on the valve stem 458, would result in the $W_f/CDP_1$ ratio being somewhere between the hot and cold limits established by curves RS and TU, for a particular gas producer engine speed, $N_g$.

During the starting operation, it may be desirable for a particular engine to function with a $W_f/CDP_1$ ratio somewhere between the VR and VT curves of FIGURE 8. This is accomplished by an additional speed bias device 467 which directly influences the moment balance lever 68 through an extension 468 formed thereon. The speed bias device 467 includes a diaphragm 470 forming a movable wall between chamber 70 and an additional chamber 472 formed in the housing 64. A stem 474 extends from the diaphragm washer 476 into the chamber 70. The stem 474 includes a flange 478 formed on the end thereof and extends through an opening 480 formed in the lever extension 468. A spring 482 confined between a spring retainer 484 formed in the chamber 70 and the diaphragm washer 476 urges the diaphragm 470 away from the chamber 70. Fuel at a pressure $P_1'$ is communicated from the passageway 246 located adjacent the centrifugal valve 218 to the chamber 472 via a passageway 486.

Functionally, before the engine is started, the spring 482 will hold the diaphragm washer 476 and hence the flange 478 at its extreme rightward position. In this position, the flange 478 will be contacting the extension 468 of the lever 68 and thus holding the valves 98 and 100 at their fully open position. After the engine starts, the $P_1'-P_2$ pressure differential across the diaphragm 470 will progressively increase. The result of this increasing pressure differential will be to move the diaphragm 470 and hence the flange 478 to the left, overcoming the spring 482 and progressively decreasing the rightward force on the end of the extension 468. All the while that the engine speed is increasing, the pressure $CDP_1$ is likewise increasing, but is not able to exert its full effect on the valve stem 72 until such time as the $P_1'-P_2$ pressure differential is high enough to move the flange 478 away from the end of the extension 468. However, as $CDP_1$ increases it will be additionally influenced by ambient temperature through the temperature sensor 324, thus varying the resistance of the lever extension 468 against the flange 478. The practical effect of this, for a particular speed in the starting range, would be a point somewhere between the VR and VT limit curves. Thereafter, the $W_t/CDP_1$ ratio will be somewhere between the RS and TU curves, as discussed above relative to the other speed bias system 423.

A means 488 for controlling the flow of igniter fuel to the engine may either be included as an integral part of the housing 64 or associated therewith as a separate package. This igniter fuel supply means 488, illustrated in FIGURE 3, includes a pressure regulator valve 490 formed on the end of a stem 492 extending from a diaphragm 494 and washer 496, the diaphragm 494 forming a movable wall between chambers 498 and 500 formed in a recess of the housing 64. The chamber 500 is vented to the atmosphere by means of a bleed outlet 502 including a fixed restriction 504. The valve 490 co-operates with a valve seat 506 which forms an opening in the wall of the chamber 498. A normally closed solenoid 508 is confined within still another chamber 510 of the housing 64. A spring 512 urges the valve portion 514 of the solenoid 508 closed against a seat 516, and a conduit communicates between one side of the orifice 514/516 and the orifice 490/506. Another passageway 520 communicates between the other side of the orifice 514/516 and the governor chamber 182. The end 522 of the valve portion 514 of the solenoid 508 may be guided in a recess 524, with any fuel contained therein being in communication with the passageway 520 via a small passageway 526.

With the device 488, the pilot may energize the solenoid 508, thereby opening the orifice 514/516 and permitting fuel at a pressure $P_2$ to flow from the governor chamber 182 through the passageway 520, past the valve 514, through passageway 518, past the valve 490 into the chamber 498 and, thence, to the igniter of the engine 10. Since the chamber 500 is subjected to air at ambient temperature, the resultant movement of the diaphragm 494 will cause fuel being supplied to the igniter past the regulating valve 490 to be maintained at a constant pressure.

From the above discussion, it should be apparent that the invention provides a compact and efficient fuel control device wherein the usual separate gas producer governing valve is not required; rather, a conventional metering valve is caused to function as a governing valve during the governing process.

It should also be apparent that the invention embodies a novel speed biasing device which may be used to simply vary the $W_t/CDP$ ratio from a constant value during particular $N_g$ speed ranges, or, in lieu thereof, one which provides a non-uniform and more complex ratio curve with increased speed, the operation of the device being influenced throughout the complete speed range by ambient or other selected temperature median between predetermined limits.

It should be further apparent that the invention embodies novel automatic shut-off valve and minimum and maximum fuel flow systems.

Although but two embodiments of the invention have been disclosed and discussed, it is apparent that other modifications of the invention are possible within the scope of the appended claims.

What I claim as my invention is:

1. A gas turbine engine fuel control, comprising a fuel inlet port, a fuel outlet port, a fuel passageway communicating therebetween, an acceleration fuel system, means in said passageway operatively connected to said acceleration fuel system for maintaining a fuel flow therethrough having a linear relationship with the pressure drop across said means, and a governor system having means in contact with said first mentioned means for at times causing said first mentioned means to serve as a governor valve.

2. A fuel control for a gas turbine engine having a compressor, a power turbine and a gas producer, comprising a body having a fuel inlet supplied by a pump, a first fuel outlet to said engine, a first passage between said inlet and said first outlet, a first valve in said first passage, said valve being formed so that fuel flow past said valve has a linear relationship to the pressure differential across said valve, a second fuel outlet to the inlet of said pump, a second passage between said inlet and said second outlet, a second valve in said second passage, said second valve being operated by means responsive to engine compressor discharge pressure, first governor means responsive to power turbine engine speed for at times bleeding off to the atmosphere a portion of said compressor discharge pressure so as to affect the operation of said compressor discharge pressure responsive means, and second governor means responsive to gas producer engine speed for at times contacting said first valve and thereby causing said first valve to function as a governing valve, thus eliminating the need for a separate governing valve.

3. A device as described in claim 2 and including additional means for modifying said compressor discharge pressure in response to changes in gas producer engine speed and ambient temperature.

4. A device as described in claim 2 and including additional means for opening said second valve in opposition to the effect of compressor discharge pressure on said second valve during the engine starting operation.

5. In a gas turbine engine fuel control including valve means responsive to engine speed for converting engine speed to a fluid pressure differential, a speed bias system comprising means responsive to said fluid pressure differential, a fluid inlet from a selected engine operational parameter, a bleed port, valve means operatively connected to said pressure responsive means for varying the degree of bleeding of said fluid through said port, and temperature responsive means for further varying the degree of bleeding of said fluid through said port.

6. A gas turbine engine fuel control, comprising a fuel inlet port; a fuel outlet port; a passageway communicating therebetween; first valve means in said passageway for controlling flow therein; a closed-loop moment balance system for controlling the position of said first valve means, said system including a movably supported lever and a second valve means for exhausting fluid from said passageway, said second valve means being pivotally connected to said lever at substantially right angles thereto, a first pressure responsive device operatively attached to said second valve means and responsive to an engine parameter, and a second pressure responsive device pivotally connected to a second point along said lever and responsive to the pressure difference across said first valve means; means for converting engine speed into a fluid pressure differential; and a third pressure responsive device responsive to said pressure differential and operatively connected to a third point along said lever for moving said lever against the force of said first pressure responsive device when said fluid pressure differential is below a predetermined amount.

7. A gas turbine engine fuel control, comprising a fuel inlet port; first and second outlet ports; separate passages communicating between said inlet port and each of said outlet ports; valve means in a first passage leading from said inlet port to said first outlet port for controlling flow therein; a closed-loop acceleration fuel system for controlling the position of said first valve means, said system including a movably supported lever and bypass valve in a second passage leading from said inlet port to said second outlet port, said bypass valve being pivotally connected to said lever at substantially right angles thereto, a first pressure responsive device fixedly attached to said bypass valve and responsive to an engine parameter, and a second pressure responsive device pivotally connected to a second point along said lever and responsive to the difference in pressure across said valve means, said second pressure responsive device forming a movable wall between the fluid in said second passage and the fluid in said first passage downstream of said valve means; means for converting engine speed into a fluid pressure differential; and a third pressure responsive device responsive to said pressure differential and operatively connected to a third point along said lever for moving said lever against the force of said first pressure responsive device when said fluid pressure differential is below a predetermined amount.

8. A gas turbine engine fuel control, comprising a fuel inlet port; a fuel outlet port; a passageway communicating therebetween; first valve means in said passageway for controlling flow therein; a closed-loop moment balance system for controlling the position of said first valve means, said system including a movably supported lever and a second valve means for exhausting fluid from said passageway, said second valve means being pivotally connected to said lever at substantially right angles thereto; a first pressure responsive device operatively connected to said second valve means and responsive to an engine parameter; a second pressure responsive device pivotally connected to a second point along said lever and responsive to the pressure difference across said first valve means; third valve means in said passageway for causing a variable pressure drop downstream of said first valve means, said third valve means including provisions for maintaining a predetermined minimum pressure drop; and third pressure responsive means adjacent said second pressure responsive device at times influencing said second pressure responsive device in response to said downstream variable pressure drop.

9. A gas turbine engine fuel control mechanism, comprising a fuel inlet port; a fuel outlet port; a passageway communicating therebetween; first valve means in said passageway for controlling flow therein; a closed-loop moment balance system for controlling the position of said first valve means, said system including a movably supported lever and a second valve means for exhausting fluid from said passageway, said second valve means being pivotally connected to said lever at substantially right angles thereto; first pressure responsive means operatively connected to said second valve means and responsive to an engine parameter; second pressure responsive means pivotally connected to a second point along said lever and responsive to the pressure difference across said first valve means; third valve means in said passageway for causing a variable pressure drop downstream of said first valve means, said third valve means including provisions for maintaining a predetermined minimum pressure drop; and resilient means located between said first pressure responsive means and said second valve means for establishing a maximum fuel flow rate.

References Cited by the Examiner
UNITED STATES PATENTS

| 2,939,280 | 6/1960 | Farkas | 60—39.28 |
| 2,943,447 | 7/1960 | Davies | 60—39.28 |
| 2,964,904 | 12/1960 | Davies | 60—39.28 X |
| 2,983,100 | 5/1961 | Dietrich et al. | 60—39.28 |
| 3,073,116 | 1/1963 | Owens | 60—39.28 X |
| 3,078,669 | 2/1963 | Williams | 60—39.28 |
| 3,139,727 | 7/1964 | Torell | 60—39.28 |
| 3,173,468 | 3/1965 | McCombs | 60—39.28 X |

JULIUS E. WEST, *Primary Examiner.*